(12) United States Patent
Gehring et al.

(10) Patent No.: US 6,849,860 B2
(45) Date of Patent: Feb. 1, 2005

(54) DETECTION SYSTEM AND A DETECTION METHOD

(75) Inventors: Roland Gehring, Elzach-Prechtal (DE); Juergen Reichenbach, Emmendingen (DE); Reinhold Kilian, Waldkirch (DE); Hubert Uhl, Waldkirch (DE); Klemens Wehrle, Waldkirch (DE); Daniel Schumacher, Teningen (DE)

(73) Assignee: Sick AG, Waldrich/Breisgau (DE)

( * ) Notice: Subject to any disclaimer, the term of this patent is extended or adjusted under 35 U.S.C. 154(b) by 284 days.

(21) Appl. No.: 10/274,412

(22) Filed: Oct. 18, 2002

(65) Prior Publication Data

US 2004/0051062 A1 Mar. 18, 2004

(30) Foreign Application Priority Data

Sep. 13, 2002 (DE) .......................................... 10242695

(51) Int. Cl.⁷ ................................................ G06K 7/10
(52) U.S. Cl. .................. 250/568; 250/221; 250/559.19; 235/462.01
(58) Field of Search .............................. 250/221, 222.1, 250/559.19, 559.24, 559.29, 559.39, 566; 235/461, 462.01, 462.46, 472.02; 356/614, 625

(56) References Cited

U.S. PATENT DOCUMENTS

| | | | | |
|---|---|---|---|---|
| 4,627,045 A | * | 12/1986 | Olson et al. ................. 370/225 |
| 6,047,222 A | * | 4/2000 | Burns et al. ................... 700/79 |
| 6,415,978 B1 | * | 7/2002 | McAllister ............. 235/462.01 |
| 6,641,042 B1 | * | 11/2003 | Pierenkemper et al. 235/462.01 |
| 6,729,544 B2 | * | 5/2004 | Navon .................... 235/462.14 |

FOREIGN PATENT DOCUMENTS

| | | |
|---|---|---|
| DE | 3826821 C2 | 2/1990 |
| EP | 0205101 B1 | 6/1986 |
| EP | 1079322 A1 | 7/2000 |
| EP | 1089190 A2 | 9/2000 |
| WO | WO 98/14853 A1 | 4/1998 |
| WO | WO 98/59464 A1 | 12/1998 |

* cited by examiner

Primary Examiner—Stephone B. Allen
(74) Attorney, Agent, or Firm—Townsend and Townsend and Crew LLP (57) ABSTRACT

The invention relates to a detection system and a detection method for the detection and tracking of optical codes on objects which are transported along a monitored zone, comprising a plurality of optoelectronic sensors to read the codes and to generate corresponding reading data and comprising at least two data buses, each having its own associated bus control unit, wherein each of the plurality of sensors is connected both to the one and to the other of the two data buses and wherein the one of the two data buses with the associated bus control unit, on the one hand, and the other data bus with the associated bus control unit, on the other hand, are divided into a primary branch and a secondary branch which is subordinate to the primary branch.

40 Claims, 3 Drawing Sheets

DETECTION SYSTEM AND A DETECTION METHOD

The invention relates to a detection system for the detection and tracking of optical codes on objects which are transported along a monitored zone and to a corresponding detection method, with a plurality of optoelectronic sensors being provided which read the codes and generate corresponding reading data. The sensors are usually connected to a data bus which is controlled by a bus control unit. The reading data generated by the sensors are forwarded—for example after a previous evaluation or other processing—as output data by the bus control unit to a system interface. The output data can there be taken over by a higher level system control unit.

The background of the invention is, for example, the use of such a detection system in a baggage sorting plant. In a baggage sorting plant, pieces of baggage, which are provided, for example, with barcodes, are transported by conveyor belts along different junctions and switches. The barcodes should be read by means of the detection system in order to detect the destination of the respective piece of baggage encoded therein, with, moreover, the position of the piece of baggage in question on the conveyor belt being detected in order, for example, to control a downstream switch in accordance with the identified destination.

In this connection, the detection system is subordinate to a master computer of the baggage sorting plant and transmits the reading data of the sensors and, for example, the instantaneous position of the pieces of baggage in question to this. The master computer processes these data for the further control of the switches or of other sorting devices of the baggage sorting plant.

There is a problem with such detection systems and detection methods in that a fault in a single component of the detection system can already cause a failure of the whole detection system and thereby effect a substantial interruption to a higher level system, for example to a higher level baggage sorting plant.

It is therefore an object to provide a detection system and a corresponding detection method which ensure the maintenance of the basic functionality of the code detection at least in the event of a fault of a single component (a so-called single fault case).

This object is satisfied by the features of the independent claims and in particular in that at least two data buses, each having its own associated bus control unit, are provided, with each of the plurality of optoelectronic sensors being connected both to the one data bus and to the other data bus, and with the one data bus with the associated bus control unit, on the one hand, and the other data bus with the associated bus control unit, on the other hand, being divided into a primary branch and a secondary branch subordinate to the primary branch.

Two separate data buses, each having a control of their own, are therefore provided which are both connected to the optoelectronic sensors and can thus access the reading data of the sensors independently of one another.

At least the data buses and the respective control are thereby designed in a redundant manner. This has the consequence that, in the case of a fault of a single bus control unit or of a single data bus or of a part hereof, the detection system remains functional without a limitation of its reading rate. In the case of such a fault, an alarm signal can be generated and emitted so that the fault component can be replaced as immediately as possible in order to restore the complete redundancy of the system.

The two data buses of the detection system are not equal with respect to the control functionality of the detection system. It is rather so that in the normal case the bus control unit associated with the primary branch of the detection system takes on a master roll relative to the bus control unit of the secondary branch. The two controls are therefore in a "master—slave" relationship with one another ("master functionality" of the bus control unit of the primary branch).

As part of this master roll of the bus control unit of the primary branch, this can, for example, carry out a check of the components of the detection system (with the exception of the bus control unit of the primary branch itself). The master role of the primary branch can, for example, also consist of only the bus control unit of the primary branch taking over the tracking of the position of a detected code or of an object provided here-with. Provision can, for example, also be made that only the bus control unit of the primary branch determines which output data are output to the system interface.

The association of the bus control units with the primary or secondary functionalities can be set in any desired manner at the start of operation of the detection system, for example via a respective data bit in a non-volatile memory of the bus control units. Only in the case of a fault of a component of the primary branch of the detection system does the bus control unit of the secondary branch with the associated data bus take over the master functionality so that the association with the primary branch and with the secondary branch are ultimately exchanged (fall-back strategy). The original secondary branch therefore serves as a replacement for the case that a component of the primary branch fails.

With a fault-free operation of the detection system, the bus control units and the data buses, however, function substantially exactly as with a detection system without a secondary branch, i.e. as with a detection system having only a single bus control unit and a single data bus. The additional load on the data buses is thereby very low, despite the redundant design of the detection system, so that a real time operation of the detection system can also easily be realized.

The redundant design of the detection system in accordance with the invention above all does not cause any higher load on the master system control unit and in particular does not cause any increased volume of output data or any inconsistent output data. The output data can namely be set within a single branch of the detection system such that the master system control unit is not loaded with contradictory data strings from the two branches of the detection system. It is, in other words, avoided that two possibly different data strings of the two branches have to be evaluated within the master system control unit to decide which of the two data strings will be further processed at all. Nor is the master system control unit subjected to the load of having to decide with respect to two inconsistent data strings of the detection system whether a component of the detection system is defective. A homogenization of the output data and a check of the detection system for possible defects can instead be carried out within the primary branch.

In accordance with an advantageous embodiment, the bus control unit of the primary branch regularly carries out a check of whether one of the data buses of the detection system is defective. The bus control unit of the secondary branch advantageously also carries out such a regular check parallel to this.

If, in this connection, a fault is determined of that data bus which was originally associated with the primary branch of the detection system, the bus control unit of the primary branch, or the bus control unit of the secondary branch, initiates a swapping of the association of the data buses and of the bus control units with the primary branch and with the secondary branch. In other words, the master functionality is then transferred from the one branch to the other branch.

It is of advantage in this connection for the bus control unit of the primary branch, or of the secondary branch, to generate an alarm signal if the explained check of the data buses shows that a fault is present within the data bus of the secondary branch. In this case, the fault namely does not yet limit the reading rate of the detection system. However, on the basis of the alarm signal, provision can immediately be made for a restoration of the functionality of the defective data bus such that the secondary branch is available as a replacement without limitation as soon as possible.

In accordance with a further advantageous embodiment, each of the two bus control units has a monitoring circuit by which a check can regularly be made of whether the other respective bus control unit is defective. It is therefore ensured by these monitoring circuits that a possible fault of a bus control unit is recognized as immediately as possible. If these checks show a fault in the bus control unit of the primary branch, the bus control unit of the secondary branch triggers a swapping of the explained division into primary branch and secondary branch. In this case, the master functionality is therefore transferred from the defective bus control unit of the primary branch to the bus control unit of the secondary branch.

The said monitoring circuit thus ensures that the functionality of the detection system is maintained even in the case of a fault in the bus control unit. This monitoring circuit does not have to be realized as a separate component, but can be realized as part of the control software within the bus control units.

It is furthermore of advantage for the two said data buses to be formed as CAN (controlled area network) buses. Of the plurality of the possible and available bus systems, the CAN bus system namely provides a particularly good real time behavior with short reaction times, and the required safety mechanisms, for the explained circuitry inside the detection system in accordance with the invention. In particular, the CAN bus system promotes a continuation of the operation of the detection system with, at most, low data losses, even if individual components of the different branches of the detection system fail.

In accordance with a further advantageous embodiment, a respective one of the plurality of optoelectronic sensors is configured as a gateway sensor which connects the data bus of the primary branch to the data bus of the secondary branch. This gateway sensor therefore allows data communication between the two data buses which are separate per se. Data can thereby also be exchanged between the two data buses without an additional physical connection being necessary.

All sensors used are preferably designed such that they can optionally be used as gateway sensors. In this case, the determination of the gateway sensor is therefore variable and is pre-set, for example, by the bus control unit of the primary branch.

It is further preferred for a regular check to be carried out of whether the instantaneously determined gateway sensor is still functional in order to determine another sensor as the gateway sensor in the event of a fault.

In accordance with a further advantageous embodiment, the detection system has at least two trigger devices which serve for the detection of an object transported in the direction of the monitored zone and which generate corresponding object detection signals. These trigger devices can, for example, be light barriers or other optoelectronic sensors or proximity sensors. The object detection signals generated by these serve to allow the subsequently read codes to be associated with a specific object and to allow the transport movement of this object to be tracked.

Provision is made that each of the two said trigger devices is connected both to the bus control unit of the primary branch and to the bus control unit of the secondary branch. A complete redundancy is thereby ensured such that, in the event of a fault of a single trigger device, an object detection signal can always still be generated and processed, irrespectively of which bus control unit is just associated with the primary branch.

The bus control units are preferably configured such that the object detection signals of the two trigger devices are linked to one another to allow a possible fault of one of the two trigger devices to be recognized. A check can in particular be made of whether, within an interval of time before or after the generation of an object detection signal by the one trigger device, an object detection signal is also generated by the other trigger device.

The risk can be present with respect to the trigger devices that a trigger device admittedly still generates object detection signals, but that these do not correspond to the correct instantaneous position of the detected object. The danger can, for example, exist that an object that is guided by a conveyor belt in the direction of the monitored zone abuts a transmitter/receiver unit or a reflector, whereby the light barrier formed in this way is offset or pivoted. In this case, an object detection signal generated by this light barrier would no longer correspond to the original distance of the light barrier from the monitored zone, which could result in erroneous associations between read codes and detected objects.

This danger can, however, be eliminated in that the reflector and/or the transmitter/receiver unit of such a light barrier is provided with an aperture diaphragm. This light barrier thereby only functions with an exact alignment of the transmitter/receiver unit and of the reflector with one another. In the case of an uncontrolled positional change of the transmitter/receiver unit or of the reflector, in contrast, an object detection signal is no longer generated so that this light barrier is ultimately identified as defective and does not accidentally emit false object detection signals.

In accordance with a further advantageous embodiment, the detection system includes at least two incremental transducers by which the transport speed of the codes, or of the object provided therewith, is detected and which generate corresponding increment signals. These increment signals therefore allow the spatial tracking and association of a detected object and thereby also permit the association of a read code with the object in question.

Provision is made for each of these two incremental transducers to be connected both to the bus control unit of the primary branch and to the bus control unit of the secondary branch. A complete redundancy is thereby provided with respect to the incremental transducers such that, in the case of a fault of a single incremental transducer, an increment signal is still always generated and forwarded to the bus control unit of the primary branch, irrespective of which bus control unit is just associated with the primary branch.

In accordance with a preferred further development, a constant monitoring takes place of whether both incremental transducers still function free of error. For this purpose, the bus control units can each have a counter, with the counter being incremented by the increment signals of the one incremental transducer and decremented by the increment signals of the other incremental transducer. A monitoring circuit checks whether the counter does not reach or exceeds a pre-determined threshold within regular time intervals. The not reaching of the threshold can thus be evaluated as a fault of the incremental transducer incrementing the counter, while the exceeding of the threshold is deemed as a fault of the incremental transducer decrementing the counter.

This kind of monitoring of the incremental transducers as to their functionality has the advantage that only very simple operations have to be carried out (incrementing, decrementing, threshold comparison). The bus control units are thereby only subjected to a minimum load.

The said counter and the said monitoring circuit do not also have to be realized as separate components, but can be realized as part of the control software of the bus control units.

In accordance with a further advantageous embodiment, at least two energy supply units are provided, with each of the plurality of optoelectronic sensors being connected, however, both to the one energy supply unit and to the other energy supply unit. It is thereby ensured that the sensors are still functional even in the case of a fault of an energy supply unit.

It must finally be mentioned with respect to the invention that the said additional functions of the bus control units, which go beyond the pure control of the data buses, can naturally also be taken over by separate control and evaluation units. For example, a first evaluation and processing of the reading data of the sensors can also be carried out within their own components and not in the bus control units.

Further embodiments of the invention are recited in the dependent claims.

The invention will be explained in the following by way of example with reference to the drawings; there are shown in these.

Figure 1:
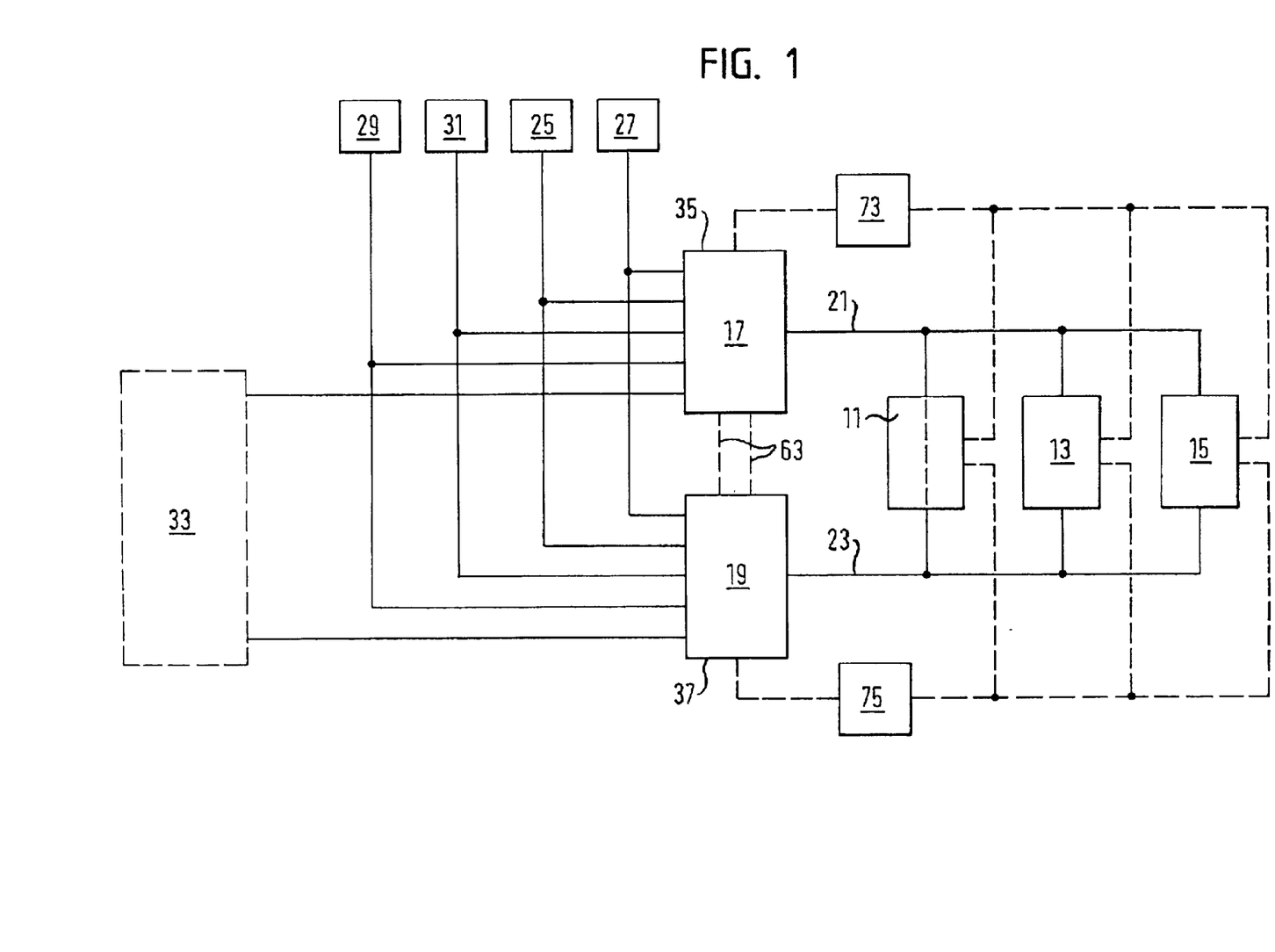
FIG. 1 a block diagram of a detection system.

FIG. 1 shows a block diagram of a detection system in accordance with the invention which is, for example, part of a baggage sorting plant. This baggage sorting plant moreover has conveyor belts (not shown in FIG. 1) on which pieces of baggage are transported which are provided with individual barcodes. These barcodes characterize the respective destination of the pieces of baggage. The detection system shown has the task of reading the codes applied to the pieces of baggage, on the one hand, and to identify the respectively read code with a position of the piece of baggage in question on the conveyor belt, on the other hand.

For this purpose, the detection system has a plurality, for example four-teen, or a different number, of optoelectronic sensors of which the three sensors 11, 13, 15 are shown by way of example in FIG. 1. These are formed by differently positioned barcode scanners which are known per se.

The detection system in accordance with FIG. 1 furthermore has two bus control units 17, 19 which are known in connection with known detection systems as OTCs (omni tracker controllers). Each bus control unit 17, 19 is connected to each sensor 11, 13, 15 via a respective data bus 21, 23. The data buses 21, 23 are formed by separate cablings.

Furthermore, two light barriers 25, 27 are shown which are arranged at the said conveyor belt and serve as trigger devices to generate object detection signals as will be explained in the following. Each light barrier 25, 27 is directly connected to both bus control units 17, 19.

In addition, two incremental transducers 29, 31 are shown in FIG. 1 which are likewise arranged on the said conveyor belt (not shown in FIG. 1) of the baggage sorting plant and which ultimately serve for the tracking of the transport movements of the detected objects, as will be explained in the following. Each incremental transducer 29, 31 is directly connected to both bus control units 17, 19.

Two energy supply units 73, 75 are furthermore shown in FIG. 1 which are each connected to one respective bus control unit 17 or 19 respectively and which are both connected to each sensor 11, 13, 15.

Finally, a master computer 3 of the baggage sorting plant is also shown in FIG. 1 which is not part of the detection system in accordance with the invention, but forms a master system control unit for the two bus control units 17, 19. The master computer 33 is connected to the two bus control units via a respective system interface 35, 37.

Figure 2:
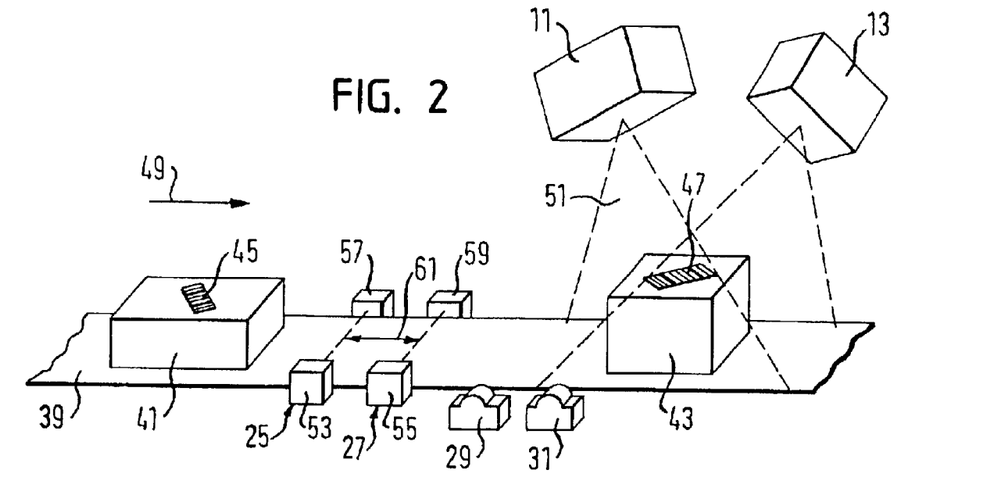
FIG. 2 a schematic perspective view of parts of the detection system in accordance with FIG. 1.

FIG. 2 schematically shows the arrangement of some components of the detection system in accordance with FIG. 1 on a conveyor belt 39 of the said baggage sorting plant. Two pieces of baggage 41, 43, which are each provided with a barcode 45, 47, are located on the conveyor belt 39. The pieces of luggage 41, 43 are moved along a transport direction 49 by means of the conveyor belt 39. The two sensors 11, 13 are shown which are arranged at a different angular position above the conveyor belt 39. Both sensors 11, 13 scan a monitored zone 51 by means of a transmitted light beam guided in fan-shape and are thereby able to read a barcode 47 of a piece of baggage 43 guided through the monitored zone 51.

Furthermore, the two light barriers 25, 27 are shown in FIG. 2 which respectively have a transmitter/receiver unit 53 and 55 respectively and a reflector 57 and 59 respectively. The two light barriers 25, 27 are arranged spaced apart from one another by an intermediate spacing 61 with respect to the transport direction 49 so that the light barrier 25 is interposed in front of the light barrier 27 with respect to the transport direction 49.

The two incremental transducers 29, 39 are additionally shown in FIG. 2 which detect the movement of the conveyor belt 39 and constantly generate increment signals whose frequency corresponds to the speed of the conveyor belt 39.

As already explained, the detection system shown in FIGS. 1 and 2 serves to read the barcodes 45, 47 of the pieces of baggage 41, 43 transported through the monitored zone 51, to associate these barcodes 45, 47 with the pieces of luggage 41, 43 and to forward corresponding output data to the master computer 33 via the system interfaces 35, 37. The master computer 33 can then, for example, set a switch at a precise time in response to these output data, said switch being disposed downstream of the detection system with respect to the transport direction 49 so that the piece of luggage 41 or 43 in question moves to a specific further conveyor belt and thus to the desired destination.

The detection system in accordance with FIGS. 1 and 2 basically functions as follows:

A bus control unit 17, 19 first detects the approaching entry of a piece of baggage 41, 43 into the monitored zone 51 on the basis of the object detection signals of the light barriers 25, 27. The position of the piece of baggage 41, 43 in question at the time of passing through the light barriers 25, 27 is thus known and this position can also be tracked on a further transport movement of the piece of baggage 41 and 43. For this purpose, the bus control unit 17, 19 in question takes into account the increment signals of the incremental transducer 29, 31 which in each case correspond to a pre-determined transport distance of the conveyor belt 39 and thus of the pieces of luggage 41, 43.

If the sensors 11, 13, 15 subsequently read a barcode 45, 47 and forward the corresponding reading data to the bus control units 17, 19 via the respective data bus 21, 23, said bus control units 17, 19 can clearly associate these reading data with the respective piece of baggage 41, 43 since their position on the conveyor belt 39, and thus within the monitored zone 51, is known. The reading data and positional data thus linked can then be forwarded to the system interfaces 35, 37.

A special feature of the detection system in accordance with FIGS. 1 and 2 consists of the fact that two separate data buses 21, 23 are provided with which a respective bus control unit 17 or 19 of their own is associated, with each of the two data buses 21, 23 being connected to all sensors 11, 13, 15. The reading data of all sensors 11, 13, 15 can thus be transmitted to the bus control unit 17 and to the bus control unit 19 independently of one another. In the event of a fault of one of the two data buses 21, 23, or of one of the two bus control units 17, 19, it is thereby ensured that all reading data are still determined and all output data can be forwarded to a system interface 35, 37.

A further special feature of the detection system in accordance with FIGS. 1 and 2 consists of the fact that the bus control units 17, 19 and the data buses 21, 23 are configured to different values. It is determined for this purpose, for example, that the data bus 21 and the associated bus control unit 17 are associated with a primary branch and the data bus 23 and the corresponding bus control unit 19 are associated with a secondary branch, with this secondary branch being a slave to the said primary branch with respect to the control of the detection system shown. The detection system can thereby be operated as already explained above in principle, with the bus control unit 17 of the primary branch, however, having a master control functionality.

This means that both bus control units 17, 19 admittedly obtain the reading data from the respective data bus 21 or 23 and can link these reading data with the object detection signals of the light barriers 25, 27 and with the increment signals of the incremental transducers 29, 31. However, the bus control unit 17 of the primary branch ensures that uniform output data are always forwarded to the master computer 33 via the system interfaces 35, 37 such that different output data are not output by the two bus control units 17, 19 at any time.

This has the advantage that consistent output data are always output to both system interfaces 35, 37 such that no evaluation of different data strings is required within the master host computer 33. No evaluation must be carried out within the master computer 33 of the output data applied to the two system interfaces 35, 37 with respect to possible defects of the detection system either. The master computer 33 is thus only exposed to a low load by the detection system and the integration of the detection system in the baggage sorting plant or in the control protocol of the master computer 33 is particularly simple.

The detection system shown therefore ultimately functions with a fault-free operation like a detection system without the data bus 23 and the bus control unit 19 of the secondary branch. Only in the case that the data bus 21, the bus control unit 17 or any other component of the primary branch becomes defective is the explained association with the primary branch or with the secondary branch swapped over so that in the example described, the bus control unit 19 takes over the master control functionality and is thus—together with the data bus 23—associated with the primary branch.

To ensure that the same output data are always applied, as explained, to the two system interfaces 35, 37, it is possible, for example, for the bus control unit 17, 19 instantaneously associated with the primary branch mirrors the output data into the secondary branch. In other words, the bus control unit 17, 19 of the primary branch overwrites the data determined in the bus control unit 19 or 17 of the secondary branch before these data are transmitted to the system interfaces 35, 37 and after all checks provided show that there is no fault within the primary branch.

Alternatively to this, however, it is also possible for only a single system interface to be provided at which the output data of the bus control unit 17 or 19 of the primary branch are always output.

A further special feature of the detection system in accordance with FIGS. 1 and 2 consists of the fact that the two data buses 21, 23 are provided as CAN buses made independently from one another.

In addition, the optoelectronic sensor 11 is configured as a gateway sensor. This sensor 11 thereby forms a connection between the data bus 21 and the data bus 23, as is indicated in FIG. 1 by the broken line. The sensor 11 thus allows communication between the data buses 21, 23 and thus between the bus control units 17, 19 without an additional physical connection being required for this. It is thereby made possible, for example, that the output data from the bus control unit 17 of the primary branch are overwritten into the bus control unit 19 of the secondary branch, as explained above, or that the bus control units 17, 19 mutually monitor one another as will be described in the following.

The following additional functionalities are possible with the detection system in accordance with FIGS. 1 and 2, with these functionalities being able to be realized independently of one another and with a combination of a plurality of these functionalities increasing the redundancy of the detection system and thus its security against failure:

(a) The bus control unit 17 of the primary branch and/or the bus control unit 19 of the secondary branch regularly checks whether one of the data buses 21, 23 is defective. If a fault of the data bus 21 of the primary branch is found, the bus control unit 17 or 19 in question triggers a swapping of the explained association with the primary branch or the secondary branch respectively. In other words, the two bus control units 17, 19 communicate with one another in this case such that the master functionality is transferred from the one bus control unit 17 to the other bus control unit 19.

If, in contrast, a fault of the data bus 23 of the secondary branch is identified, the bus control unit 17 or 19 in question generates an alarm signal so that this fault can be remedied as immediately as possible. This alarm signal can be output at a separate optical or acoustic signal output of the detection system (not shown in FIGS. 1 and 2) and/or be forwarded to the master computer 33 via the system interfaces 35, 37.

The explained check of the data buses 21, 23 for a possible fault can be carried out, for example, on the basis of a comparison of whether reading data or other signal data of the sensors 11, 13, 15 are received via the one data bus 21 from the same number of sensors 11, 13, 15 as via the other data bus 23. In the event of a different number, it is assumed that the data bus 21 or 23 with the lower number of available data strings is defective.

A comparison circuit can be provided as a separate component for this comparison; preferably, however, the comparison is carried out by the control software of the bus control unit 17, 19 in question.

(b) The two bus control units 17, 19 communicate regularly with one another to check whether the other respective bus control unit 19 or 17 is defective.

If such a check reveals a fault of the bus control unit 17 of the primary branch, the bus control unit 19 of the secondary branch triggers a swapping of the explained association with the primary branch and with the secondary branch such that this bus control unit 19 therefore now takes over the master functionality.

If, in contrast, the bus control unit 17 of the primary branch finds a fault of the bus control unit 19 of the secondary brand, it generates an alarm signal inside the detection system and/or at the system interfaces 35, 37 so that the defective bus control unit 19 can be replaced as soon as possible. In this case, the explained association with the primary branch and with the secondary branch is maintained and no data loss occurs due to the failure of the bus control unit 19.

The mutual monitoring of the bus control units 17, 19 can take place, for example, in that each bus control unit 17, 19 respectively regularly generates a control signal by means of a control signal generator which is communicated to the other respective bus control unit 19 or 17. In addition, each bus control unit 17, 19 can have a reception monitoring circuit to regularly check whether the said control signal is being received by the other respective bus control unit 19 or 17. This reception must take place within a pre-determined time interval (countdown of a so-called "watchdog timer"); otherwise a fault of the other respective bus control unit 19 or 17 is assumed.

The said control signal generator and the reception monitoring circuit do not have to be realized as separate components, but can instead be realized as part of the control software of the bus control units 17, 19.

The communication between the two bus control units 17, 19, which is necessary for the explained check, takes place either as part of the data bus communication via the explained gateway sensor (11) (so-called "heartbeat" telegram within the bus protocol). Or the two bus control units 17, 19 are connected to one another via special direct connection lines 63 so that direct communication is possible ("ping" signal).

The communication between the bus control units 17, 19 via the gateway sensor 11 has the advantage that no additional direct connection line 63 is necessary. The direct connection lines 63 have the advantage over this that the data buses 21, 23 are not constantly loaded by the "heartbeat" telegram of the bus control units 17, 19 so that particularly short reaction times ("watchdog" times) are possible in this case.

It is of particular advantage for the mutual monitoring of the bus control units 17, 19 to take place both via a "heartbeat" telegram and via a direct connection line 63, since in this case additional redundancy is provided. If, namely, the "heartbeat" telegram is not received via the data buses 21, 23, and a control signal is nevertheless received in time via the direct connection lines 63, it can, for example, be precluded that a fault of the gateway sensor 11 or of a data bus 21, 23 is erroneously considered as a fault of the other respective bus control unit 19 or 17.

(c) The bus control unit 17 of the primary branch can regularly check whether one of the optoelectronic sensors is defective in order, if this is the case, to generate an alarm signal and to indicate this within the detection system or to forward it to the master computer 33. The defective sensor can thereby be replaced as immediately as possible in order again to achieve the largest possible reading rate of the detection system.

This check can take place, for example, by a comparison of whether the number of reading data strings instantaneously received via the data bus 21, 32 corresponds to the number of sensors 11, 13, 15 which was determined, for example, at the system start as a slave list by the bus control unit 17 of the primary branch.

(d) The already explained gateway sensor 11 can be variably determinable. In other words, the sensors 11, 13, 15 can be made such that optionally each of these sensors can be configured as a gateway sensor. In the event of a fault of that sensor 11, which was originally configured as the gateway sensor, another sensor 13, 15 can thereby be defined as the gateway sensor in order to continue to allow data communication between the bus control units 17, 19 via the data buses 21, 23.

In this connection, it is of special advantage for the bus control unit 17 of the primary branch to check regularly whether the sensor 11 last configured as the gateway is defective. This check can, as explained above under (b), take place indirectly, for example, in that the two bus control units 17, 19 both exchange a "heartbeat" telegram via the data buses 21, 24 and communicate mutual control signals via a direct connection line 63.

(e) The detection system has two light barriers 25, 27 which are both respectively connected to both bus control units 17, 19. Even in the event of a fault of one of the two light barriers 25, 27 an object detection signal can still thereby be received by the bus control units 17, 19 in order to be able to associate the read barcodes 45, 47 with the correct piece of baggage 41 or 43.

However, as long as both light barriers 25, 26 function without error, their object detection signals can, for example, be processed as follows: the two light barriers 25, 27 are divided into a primary light barrier 25 and a secondary light barrier 27. Basically, the object detection signal of the primary light barrier 25 is used by the bus control unit 17 of the primary branch to track the transport movement of a piece of baggage 41, 43. Only in the event of a fault of the primary light barrier 25 does the bus control unit 17 use the object detection signal of the secondary light barrier 27. Provided that the intermediate spacing 61 between the two light barriers 25, 27 is known, such a change from the object detection signals of the primary light barrier 25 to the object detection signals of the secondary light barrier 27 does not result in any data loss, since this intermediate spacing 61 can be taken into account as an offset.

The monitoring of whether one of the two light barriers 25, 27 is defective can, for example, take place as follows: the two light barriers 25, 27 are, as already explained in connection with FIG. 2, arranged offset with respect to one another with regard to the transport direction 49. After the generation of an object detection signal by the upstream light barrier 25, a check is made of whether an object detection signal is also generated by the downstream light barrier 27 within a time interval which corresponds to the know intermediate spacing 61 and to the transport speed of the conveyor belt 61, with the said transport speed being known from the increment signals of the incremental transducers 29, 31. If the explained check supplies a negative signal, a fault of the downstream light barrier 27 is assumed.

In addition, a check is made on the generation of an object detection signal by the downstream light barrier 27 of whether an object detection signal was already generated by the upstream light barrier 25 prior to the generation of this object detection signal within a time interval which again corresponds to the known intermediate spacing 61 and to the transport speed of the conveyor belt 39. If this is not the case, a fault of this upstream light barrier 25 is assumed.

If a fault of a light barrier 25, 27 is detected in this manner, a corresponding alarm signal is generated so that the light barrier 25, 27 can be replaced as immediately as possible.

(f) With the explained application of the detection system within a baggage sorting plant, there is the danger that a piece of baggage 41, 43 transported by the conveyor belt 39 contacts a light barrier 25, 27 or a part thereof and is thereby spatially offset. It is in particular possible that the transmitter/receiver unit 53 of the upstream light barrier 25 is pivoted such that the transmitted light beam is directed onto the reflector 59 of the downstream light barrier 27 and is reflected by this such that the light barrier 25 no longer extends perpendicular to the transport direction 49 and thus no longer has its original extent along the conveyor belt 39. This change admittedly does not result in a functional failure of the light barrier 25 and is therefore not normally registered by the detection system, it can, however, result in an incorrect association of the read barcode 45, 47 with the pieces of luggage 41, 43, since the light barrier 25 now adopts a different distance from the monitored zone 51.

Figure 3:
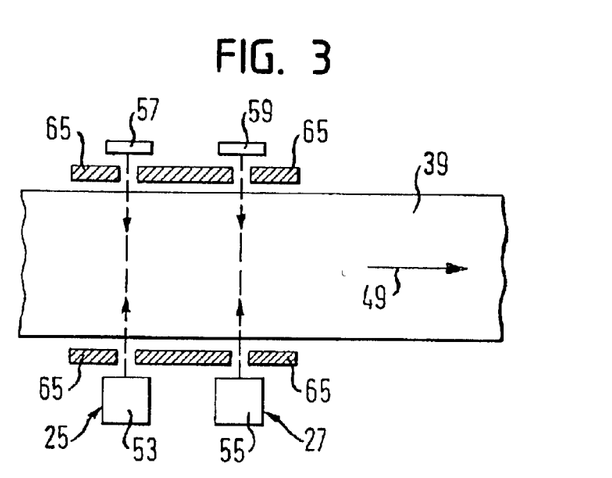
FIGS. 3 and 4 in each case, a schematic plan view of two trigger devices.

To avoid this risk, the reflectors 57, 59 and the transmitter/receiver units 53, 55 of the light barriers 25, 27 can each be provided with deep aperture diaphragms 65, as shown in FIG. 3. These aperture diaphragms 65 have the effect that in the case of an unwanted spatial offset or pivot of the transmitter/receiver unit 53, 55, or of the reflector 57, 59, the light barrier 25, 27 in question no longer delivers an object detection signal and can thus be recognized as defective. Alternatively, it is also sufficient for only the reflector 57, 59, or only the transmitter/receiver unit 53, 55 to be provided with such an aperture diaphragm 65.

Figure 4:
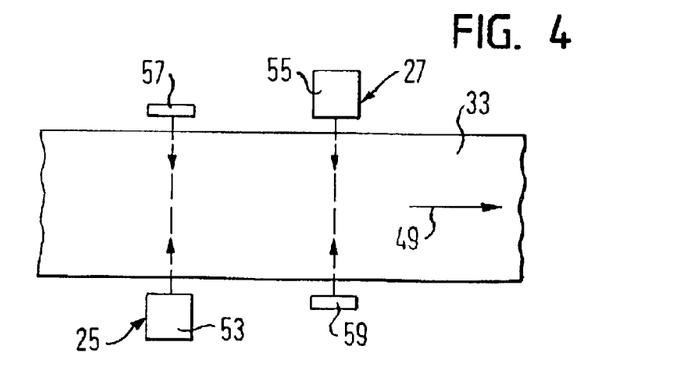

Alternatively or additionally, the explained risk of false object detection signals can be avoided in that adjacent light barriers 25, 27 are arranged in opposite directions parallel to one another, as shown in FIG. 4. In other words, the reflector 57 of the one light barrier 25 is arranged on the other respective side than the reflector 59 of the other light barrier 27 with respect to the conveyor belt 39. The same applies accordingly to the respective transmitter/receiver unit 53 or 55 of these two light barriers 25, 27. If the transmitter/receiver unit 53 of the one light barrier 25 is now impacted and pivoted by a piece of baggage 41, 43, this transmitter/receiver unit 53 cannot be unintentionally directed to the reflector 59 of the other light barrier 27, since this reflector 59 is located on the same side of the conveyor belt 39 as the said transmitter/receiver unit 53. It is thereby likewise very largely precluded that the light barrier 25 in question continues to produce and forward object detection signals although a significant interruption to operation has occurred. Instead, the failure of this light barrier 25 can now be recognized.

(g) As shown in FIGS. 1 and 2, two incremental transducers 29, 31 can be provided which generate increment signals independently of one another to indicate the transport speed of the pieces of baggage 41, 43, and which are both respectively connected to both bus control units 17, 19. The detection system is thereby also redundantly designed with respect to the incremental transducers 29, 31 so that in the event of a fault of one of the two incremental transducers 29, 31, the bus control units 17, 19 continue to receive increment signals.

The increment signals can basically be processed such that, with the fault-free operation of the detection system, the bus control unit 17 of the primary branch takes over the tracking of the pieces of baggage 41, 43.

The two incremental transducers 29, 31 can be divided into a primary incremental transducer 29 and into a secondary incremental transducer 31, with the increment signals of the primary incremental transducer 39 being used, with fault-free operation of these two incremental transducers 29, 31, to track the pieces of baggage 41, 43. Only with a fault of this primary incremental transducer 29 are the increment signals of the secondary incremental transducer 31 subsequently used.

A monitoring of whether such a fault of an incremental transducer 29, 31 is present can be carried out, for example, as follows: a counter 67 is operated within each bus control unit 17, 19 which is counted up by the increment signals of the one incremental transducer 29 and is counted down by the increment signals of the other incremental transducer 31. As soon as the counter 67 falls below a pre-determined lower threshold 69, a fault of the first mentioned incremental transducer 29 is assumed. Vice versa, an exceeding of an upper threshold 71 is interpreted as a fault of the last-named incremental transducer 31. This threshold comparison is shown schematically in FIG. 5.

Figure 5:
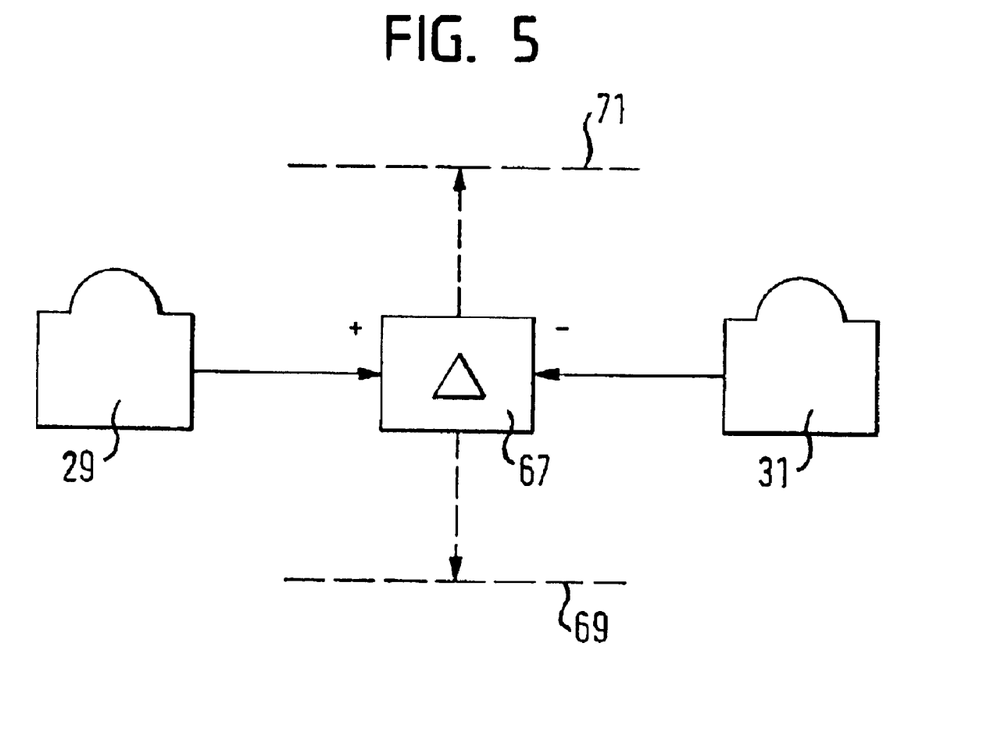
FIG. 5 a schematic representation of the monitoring of two incremental transducers with respect to their functionality.

So that only minor differences between the increment signal formation within the two incremental transducers 29, 31 are not interpreted as a fault of one of the two incremental transducers 29, 31, the counter 67 is regularly reset after pre-determined time intervals, that is set to a mean value between the upper threshold 71 and the lower threshold 69.

(h) Two energy supply units 73, 75 are provided, with each sensor 11, 13, 15 being connected to both energy supply units 73, 75 to optionally be supplied with electrical power from the one or from the other energy supply unit 73, 75. The energy supply of the sensors 11, 13, 15 is thereby also designed redundantly so that, in the event of a fault of a energy supply 73, 75 all sensors 11, 13, 15 continue to be functional.

Figure 6:
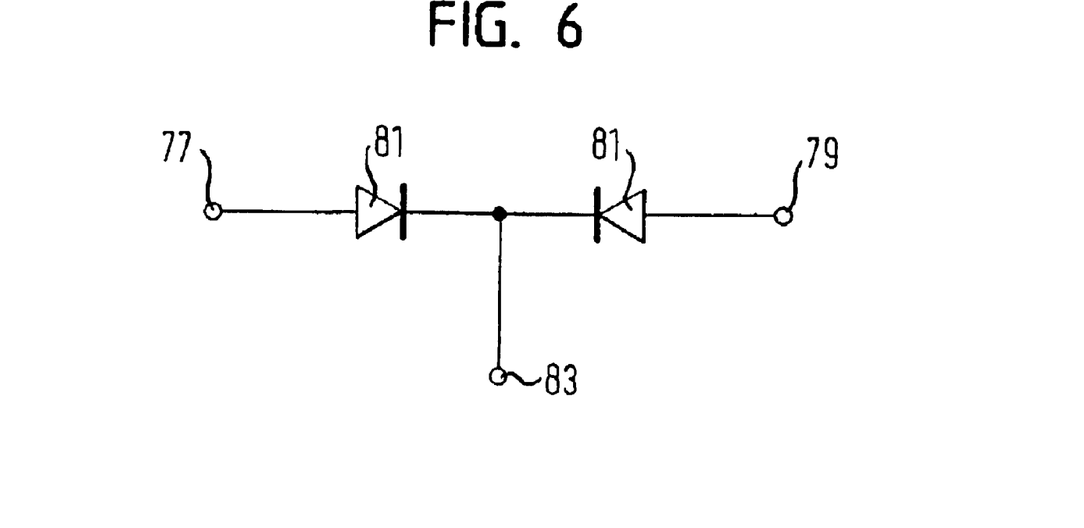
FIG. 6 a circuit diagram of a short circuit signaling wiring diagram.

Each sensor 11, 13, 15 is preferably provided with a short circuit signaling wiring diagram by which it is ensured that, even in the event of a fault of the one energy supply unit 43, no short circuit occurs at the respective supply input of the sensors 11, 13, 15 and the other energy supply unit 75 can thus take over the energy supply without disturbance.

FIG. 6 shows an example of such a short circuit signaling wiring diagram. A first connection 77 for the one energy supply unit 73 and a second connection 79 for the other energy supply unit 75 are shown. Two diodes 81 are provided in an oppositely poled arrangement between these two connections 77, 79, with the power input 83 of the sensor 11, 13, 15 in question being provided between the two diodes 81.

The bus control units 17, 19 are respectively supplied only from one of the two energy supply units 73, 75. It is optionally possible for the supply of the respectively one bus control unit 17, 19 to be monitored via a switch input of the other bus control unit 19 or 17 respectively. Not only the failure of a energy supply unit 73, 75 can thereby be detected, but, in the event of a failure of a bus control unit 17, 19, it can also be differentiated between a fault of this bus control unit 17, 19 and a fault of the respective energy supply unit 73 or 75.

Reference Numeral List

| | |
|---|---|
| 11, 13, 15 | optoelectronic sensor |
| 17, 19 | bus control unit |
| 21, 23 | data bus |
| 25, 27 | light barrier |
| 29, 31 | incremental transducer |
| 33 | master computer |
| 35, 37 | system interface |
| 39 | conveyor belt |
| 41, 43 | piece of baggage |
| 45, 47 | barcode |
| 49 | transport direction |
| 51 | monitored zone |
| 53, 55 | transmitter/receiver unit |
| 57, 59 | reflector |
| 61 | intermediate spacing |
| 63 | direct connection line |
| 65 | aperture diaphragm |
| 67 | counter |
| 69 | lower threshold |
| 71 | upper threshold |
| 73, 75 | energy supply unit |
| 77, 79 | connection |
| 81 | diode |
| 83 | supply input |

What is claimed is:

1. A detection system for the detection and tracking of optical codes (45, 47) on objects (41, 43) which are transported along a monitored zone,
comprising a plurality of optoelectronic sensors (11, 13, 15) to read the codes and to generate corresponding reading data;
further comprising at least two data buses (21, 23) each having its own associated bus control unit (17, 19); and
comprising at least one system interface (35, 37) to output output data to a higher level system control unit (33),
wherein each of the plurality of sensors (11, 13, 15) is connected both to the one (21) and to the other (23) of the two data buses; and
wherein the one (21) of the two data buses with the associated bus control unit (17), on the one hand, and the other data bus (23) with the associated bus control unit (19), on the other hand, are divided into a primary branch and a secondary branch which is subordinate to the primary branch.

2. A detection system in accordance with claim 1, characterized in that the two bus control units (17, 19) are configured such that, with a fault-free operation of the detection system, only the output data determined within the primary branch (17, 21) are output to the system interface (35, 37).

3. A detection system in accordance with claim 1, characterized in that the two bus control units (17, 19) are configured such that, with a fault-free operation of the detection system, the bus control unit (17) of the primary branch mirrors the output data determined inside the primary branch (17, 21) into the secondary branch (19, 23).

4. A detection system in accordance with claim 1, characterized in that at least one bus control unit (17, 19) has a monitoring circuit to check regularly whether one of the data buses (21, 23) is defective.

5. A detection system in accordance with claim 4, characterized in that a swapping of the division into primary branch and secondary branch can be triggered by the bus control unit (17, 19) if the check reveals a fault of the data bus (21) of the original primary branch.

6. A detection system in accordance with claim 5, characterized in that an alarm signal can be generated by the bus control unit (17, 19) if the check reveals a fault of the data bus (23) of the secondary branch.

7. A detection system in accordance with claim 4, characterized in that the monitoring circuit has a comparison circuit to compare the check results determined for the two data buses (21, 23),
wherein the comparison circuit indicates a fault of that data bus for which signal data of a lower number of sensors (11, 13, 15) are determined than for the other respective data bus.

8. A detection system in accordance with claim 1, characterized in that each of the two bus control units (17, 19) has a monitoring circuit to check regularly whether the other respective bus control unit is defective.

9. A detection system in accordance with claim 8, characterized in that an alarm signal can be generated by the bus control unit (17) of the primary branch if the check reveals a fault of the bus control unit (19) of the secondary branch.

10. A detection system in accordance with claim 8, characterized in that a swapping of the division into primary branch and secondary branch can be triggered by the bus control unit (19) of the original secondary branch if the check reveals a fault of the bus control unit (17) of the original primary branch.

11. A detection system in accordance with claim 8, characterized in that the two bus control units (17, 19) are connected to one another via a respective direct connection (63) or via the two associated data buses (21, 23, 11),
wherein each of the two bus control units (17, 19) has a control signal generator to regularly generate a control signal which is transmitted to the other respective bus control unit; and
wherein each of the two bus control units (17, 19) has a reception monitoring circuit to regularly check whether the control signal was received within a pre-determined time interval by the other respective bus control unit.

12. A detection system in accordance with claim 1, characterized in that at least one bus control unit (17, 19) has a monitoring circuit to regularly check whether one of the optoelectronic sensors (11, 13, 15) is defective,
wherein an alarm signal can be generated by the monitoring circuit if the check reveals a fault of a sensor.

13. A detection system in accordance with claim 1, characterized in that the two data buses (21, 23) are made as CAN buses.

14. A detection system in accordance with claim 1, characterized in that one (11) of the plurality of sensors is configured as a gateway sensor which connects the data bus (21) of the primary branch to the data bus (23) of the secondary branch.

15. A detection system in accordance with claim 14, characterized in that at least one bus control unit (17, 19) has a monitoring circuit to regularly check whether the gateway sensor (11) is defective,
wherein the configuration of another sensor (13, 15) as the gateway sensor can be triggered by the bus control unit in question if the check reveals a fault of the original gateway sensor (11).

16. A detection system in accordance with claim 1, characterized in that at least two trigger devices (25, 27) are provided to detect an object (41, 43) transported in the direction of the monitored zone (51) and to generate a corresponding object detection signal,
wherein each of the two trigger devices (25, 27) is connected both to the one (17) and to the other (19) of the two bus control units.

17. A detection system in accordance with claim 16, characterized in that the two trigger devices (25, 27) are associated with one another at a pre-determined intermediate spacing (61) with respect to the transport direction (49) of the objects such that they are disposed upstream or downstream of one another with respect to the transport direction of the objects.

18. A detection system in accordance with claim 16, characterized in that at least one bus control unit (17, 19) has a monitoring circuit by which a check can be made of
whether an object detection signal is also generated by the downstream trigger device (27) after the generation of an object detection signal by the upstream trigger device (25) within a time interval which corresponds to the pre-determined intermediate spacing (61) and to the transport speed of the objects (41, 43); and
whether an object detection signal was already generated by the upstream trigger device (25) before the generation of an object detection signal by the downstream trigger device (27) within a time interval which corresponds to the pre-determined intermediate distance (61) and the transport speed of the objects (41, 43).

19. A detection system in accordance with claim 18, characterized in that an alarm signal can be generated by the monitoring circuit if the check reveals a fault of a trigger device (25, 27).

20. A detection system in accordance with claim 16, characterized in that each trigger device has a light barrier (25, 27) with a transmitter/receiver unit (53, 55) and a reflector (57, 59),
wherein the transmitter/receiver unit of each light barrier, on the one hand, and the reflector of this light barrier, on the other hand, are arranged lying opposite one another with respect to the path of movement (39) of the transported objects (41, 43); and
wherein the reflector (57, 59) of this light barrier, or the transmitter/receiver unit (53, 55) of this light barrier, or both, are arranged behind a respective aperture diaphragm (65) so that the light transmission of this light barrier is interrupted in the event of an unintentional offset of the transmitter/receiver unit.

21. A detection system in accordance with claim 16, characterized in that each trigger device has a light barrier (25, 27) with a transmitter/receiver unit (53, 55) and a reflector (57, 59),
wherein the transmitter/receiver unit of each light barrier, on the one hand, and the reflector of this light barrier, on the other hand, are arranged lying opposite one another with respect to the path o movement (39) of the transported objects (41, 43); and
wherein the reflector (57) of the one light barrier (25) is arranged on a different side from the reflector (59) of the other light barrier (27) with respect to the path of movement of the transported objects.

22. A detection system in accordance with claim 16, characterized in that the two trigger devices (25, 27) are divided into a primary trigger device (25) and a secondary trigger device (27),
wherein the bus control units (17, 19) are configured such that, with a fault-free operation of the two trigger devices, the object detection signal of the primary trigger device (25) is used to track the transport movement of the detected object (41, 43); and in that the object detection signal of the secondary trigger device (27) is only used to track the transport movement of the detected object with a fault of the primary trigger device.

23. A detection system in accordance with claim 1, characterized in that at least two incremental transducers (29, 31) are provided to detect the transport speed of the objects (41, 43) and to generate corresponding increment signals,
wherein each of the two incremental transducers (29, 31) is connected both to the one (17) and to the other (19) of the two bus control units.

24. A detection system in accordance with claim 23, characterized in that the two incremental transducers are divided into a primary incremental transducer (29) and into a secondary incremental transducer (31),
wherein the bus control units (17, 19) are configured such that, with fault-free operation of the two incremental transducers, the increment signals of the primary incremental transducer (29) are used to track the transport movement of the objects (41, 43); and in that the increment signals of the secondary incremental transducer (31) are used to track the transport movement of the objects only with a fault of the primary incremental transducer.

25. A detection system in accordance with claim 23, characterized in that at least one bus control unit (17, 19) has a counter,
wherein the counter can be incremented by the increment signals of the one (29) of the two incremental transducers and can be decremented by the increment signals of the other (31) of the two incremental transducers; and
wherein the bus control unit in question has a monitoring circuit to check whether the counter falls below or exceeds a pre-determined threshold (69, 71) within regular time intervals.

26. A detection system in accordance with claim 25, characterized in that the bus control unit (17, 19) is configured such that, when the threshold (69) is not reached, the monitoring circuit indicates a fault of the incremental transducer (29) incrementing the counter; and in that, when the threshold (71) is exceeded, the monitoring circuit indicates a fault of the incremental transducer (31) decrementing the counter.

27. A detection system in accordance with claim 1, characterized in that at least two energy supply units (73, 75) are provided,
wherein each of the plurality of sensors (11, 13, 15) is connected both to the one and to the other of the two energy supply units.

28. A detection system in accordance with claim 27, characterized in that each sensor (11, 13, 15) has a short circuit security switch with two diodes (81) connected with opposite poles and to one each of which a respective one of the two energy supply units (73, 75) is connected.

29. A detection system in accordance with claim 27, characterized in that the one (17) of the two bus control units is only connected to the one (73) of the two energy supply units and the other bus control unit (19) is only connected to the other energy supply unit (75).

30. A detection system in accordance with claim 1, wherein each of the plurality of optoelectronic sensors (11, 13, 15) is formed by a code scanner.

31. A method for the detection and tracking of optical codes (45, 47) on objects (41, 43) which are transported along a monitored zone (51), by means of a detection system comprising a plurality of optoelectronic sensors (11, 13, 15) and at least two data buses (21, 23), with a respective bus control unit (17, 19) being associated with each of the data buses, wherein each of the plurality of sensors (11, 13, 15) is connected both to the one (21) and to the other (23) of the two data buses, in particular in accordance with any one of the preceding claims, wherein the one (21) of the two data buses with the associated bus control unit (17), on the one hand, and the other data bus (23) with the associated bus control unit (19), on the other hand, are divided into a primary branch and a secondary branch which is subordinate to the primary branch.

32. A method in accordance with claim 31, characterized in that, with a fault-free operation of the detection system, only output data determined within the primary branch (17, 21) are output to a system interface (35, 37).

33. A method in accordance with claim 31, characterized in that, with a fault-free operation of the detection system, output data which are determined within the primary branch are mirrored into the secondary branch.

34. A method in accordance with claim 31, characterized in that a check is regularly made of whether one of the data buses (17, 19) is defective, wherein the division into primary branch and secondary branch is swapped if the check reveals a fault of the data bus (17) of the original primary branch.

35. A method in accordance with claim 31, characterized in that an alarm signal, is generated if the check reveals a fault of the data bus (19) of the secondary branch.

36. A method in accordance with claim 31, characterized in that a check is regularly made of whether one of the two bus control units (17, 19) is defective, wherein the division into primary branch and secondary branch is swapped if the check reveals a fault of the bus control unit (17) of the original primary branch.

37. A method in accordance with claim 36, characterized in that an alarm signal is generated if the check reveals a fault of the bus control unit (19) of the secondary branch.

38. A method in accordance with claim 31, characterized in that a check is regularly made of whether one of the optoelectronic sensors (11, 13, 15) is defective;

wherein an alarm signal is generated if the check reveals a fault of a sensor.

39. A method in accordance with claim 31, characterized in that one (11) of the plurality of sensors (11, 13, 15) is configured as a gateway sensor which connects the data bus (17) of the primary branch to the data bus (19) of the secondary branch.

40. A method in accordance with claim 39, characterized in that a check is regularly made of whether the gateway sensor (11) is defective, wherein another sensor (13, 15) is configured as a gateway sensor if the check reveals a fault of the original gateway sensor (11).

* * * * *

UNITED STATES PATENT AND TRADEMARK OFFICE
CERTIFICATE OF CORRECTION

PATENT NO. : 6,849,860 B2
DATED : February 1, 2005
INVENTOR(S) : Roland Gehring et al.

It is certified that error appears in the above-identified patent and that said Letters Patent is hereby corrected as shown below:

<u>Title page,</u>
Item [73], Assignee, please delete "Waldrich/Breisgau" and insert therefor
-- Waldkirch/Breisgau --.

Signed and Sealed this

Thirty-first Day of May, 2005

JON W. DUDAS
*Director of the United States Patent and Trademark Office*